(12) United States Patent
Choi et al.

(10) Patent No.: US 8,898,711 B2
(45) Date of Patent: Nov. 25, 2014

(54) METHOD AND APPARATUS FOR SENDING/RECEIVING VOD STREAMING SERVICE PROVIDING CLIENT-FAVORED ADVERTISEMENT

(75) Inventors: Hee-kyung Choi, Gyeonggi-do (KR); Kang-wook Chun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 881 days.

(21) Appl. No.: 12/230,493

(22) Filed: Aug. 29, 2008

(65) Prior Publication Data
US 2009/0025047 A1 Jan. 22, 2009

Related U.S. Application Data

(63) Continuation of application No. 10/394,578, filed on Mar. 24, 2003, now abandoned.

(30) Foreign Application Priority Data

Mar. 23, 2002 (KR) .................. 10-2002-0015900

(51) Int. Cl.
*H04N 7/173* (2011.01)
*H04N 7/10* (2006.01)
*H04N 21/258* (2011.01)
*H04N 21/442* (2011.01)
*H04N 21/6437* (2011.01)
*H04N 21/472* (2011.01)
*H04N 21/61* (2011.01)
*H04N 21/81* (2011.01)
*H04N 21/24* (2011.01)
*H04N 21/6587* (2011.01)
*H04N 21/4722* (2011.01)

(52) U.S. Cl.
CPC ..... *H04N 7/17318* (2013.01); *H04N 21/25891* (2013.01); *H04N 21/44204* (2013.01); *H04N 21/6437* (2013.01); *H04N 21/47202* (2013.01); *H04N 21/6175* (2013.01); *H04N 21/812* (2013.01); *H04N 21/6125* (2013.01); *H04N 21/2407* (2013.01); *H04N 21/6587* (2013.01); *H04N 21/4722* (2013.01)
USPC .................. 725/87; 725/32; 725/91

(58) Field of Classification Search
None
See application file for complete search history.

(56) References Cited

U.S. PATENT DOCUMENTS 5,900,904 A * 5/1999 Okada et al. ............... 725/92
6,006,257 A * 12/1999 Slezak ...................... 725/110

(Continued)

FOREIGN PATENT DOCUMENTS

| CN | 1216662 | 5/1999 |
| EP | 1071287 | 1/2001 |

(Continued)

OTHER PUBLICATIONS

U.S. Appl. No. 10/394,578, filed Mar. 24, 2003, Hee-kyung Choi et al., Samsung Electronics Co., Ltd.

(Continued)

*Primary Examiner* — Jason K Lin
(74) *Attorney, Agent, or Firm* — Staas & Halsey LLP

(57) ABSTRACT

An apparatus and a method of sending/receiving video on demand (VOD) streaming service according to providing client-favored advertisement. A VOD server and a VOD client terminal tie the VOD streaming service to client advertisement selection interactions, such as advertisement receipt selections, advertisement selection attributes (e.g., type, mode, etc.). The VOD server comprises a service controller providing to clients multimedia contents and specific advertisement contents selected by the clients to receive and a data storing unit storing the multimedia contents, the advertisement contents, and the client data.

20 Claims, 5 Drawing Sheets

(56) References Cited

U.S. PATENT DOCUMENTS

| | | | |
|---|---|---|---|
| 6,473,903 B2 | 10/2002 | Balakrishnan et al. | |
| 6,588,015 B1* | 7/2003 | Eyer et al. | 725/89 |
| 6,857,130 B2* | 2/2005 | Srikantan et al. | 725/93 |
| 7,017,173 B1* | 3/2006 | Armstrong et al. | 725/87 |
| 7,073,191 B2 | 7/2006 | Srikantan et al. | 725/87 |
| 2001/0054181 A1* | 12/2001 | Corvin | 725/42 |
| 2002/0013949 A1* | 1/2002 | Hejna, Jr. | 725/100 |
| 2002/0053075 A1* | 5/2002 | Paz et al. | 725/10 |
| 2002/0059598 A1* | 5/2002 | Sugimoto et al. | 725/39 |
| 2002/0178445 A1 | 11/2002 | Eldering et al. | 725/32 |
| 2003/0088872 A1* | 5/2003 | Maissel et al. | 725/46 |
| 2005/0262539 A1* | 11/2005 | Barton et al. | 725/90 |
| 2007/0067800 A1* | 3/2007 | Wachtfogel et al. | 725/42 |
| 2010/0242063 A1* | 9/2010 | Slaney et al. | 725/32 |

FOREIGN PATENT DOCUMENTS

| | | |
|---|---|---|
| JP | 9-065321 | 3/1997 |
| JP | 2001-069489 | 3/2001 |
| JP | 2001-309339 | 11/2001 |
| KR | 10-2001-0096454 | 11/2001 |
| KR | 2002-0013031 | 2/2002 |

OTHER PUBLICATIONS

"Interactive TV and Multimedia Technology", 1997, pp. 22-29.
Chinese Office Action dated May 13, 2005 from Chinese Patent Application No. 031038352.

* cited by examiner

METHOD AND APPARATUS FOR SENDING/RECEIVING VOD STREAMING SERVICE PROVIDING CLIENT-FAVORED ADVERTISEMENT

CROSS-REFERENCE TO RELATED APPLICATIONS

This is a continuation application based on U.S. patent application Ser. No. 10/394,578 filed Mar. 24, 2003 now abandoned and claims the priority of Korean Patent Application No. 2002-15900, filed Mar. 23, 2002 in the Korean Intellectual Property Office, the disclosure of which is incorporated herein in its entirety by reference.

BACKGROUND OF THE INVENTION

1. Field of the Invention

The present invention relates to video on demand (VOD) streaming service, and more particularly, to an apparatus and a method for clients/users to select and request advertisements during the VOD streaming service (VOD service).

2. Description of the Related Art

VOD streaming service has undergone remarkable developments, technically. However, the VOD streaming service business is in a rudimentary stage compared to the technical developments due to the absence of business models.

An example of a conventional method of advertising for VOD streaming service includes providing advertisements prior to contents which a client desires to receive, when an Internet contents service provider provides the desired contents to the client. In order to perform the method, the Internet contents service provider receives advertisement contents from advertisers and processes the advertisement contents into files to be transferred over the Internet. The Internet contents service provider adds searching data to the processed files and stores the files in a database server. When the client accesses the web server of the Internet contents service provider and selects contents of a service, advertisement contents corresponding to personal information on the client and the selected service contents, are searched in the database server and provided to the client. In particular, when the client watches the received selected advertisements, a check message is transferred to the web server of the Internet contents service provider. When the web server receives the check message, the web server provides the client the selected service contents from the database server.

FIG. 1 is a system diagram of a conventional video on demand (VOD) streaming service system. The conventional VOD streaming service system is formed of a VOD server 100, a network 110, clients 120, and an advertiser 130. Here, the VOD server 100 providing VOD streaming service, processes various multimedia contents and stores them in a database. The network 110 is a virtual space where data are transferred when requesting the VOD streaming service and providing the contents in connection with the VOD. The clients 120 are terminals outputting multimedia data requests for the VOD streaming service from the VOD server 100 through the network 110 and processing received multimedia contents in response to the requests, thereby allowing a user to select and output favored contents from among the contents provided from the VOD server 100. The advertiser 130 pays money to a VOD streaming service provider having the VOD server 100 so that the VOD server 100 provides advertisement contents of the advertiser 130, along with VOD contents, to the clients 120. In particular, the advertiser 130 and/or the Internet contents provider 100 control and provide advertisements according to client profiles collected by the VOD server 100 prior to allowing the clients 120 to receive selected services, such as VOD services (multimedia service content).

In another example of the conventional method of advertising for a VOD streaming service, when the client watches the advertisements, the corresponding advertiser pays a fee for the VOD contents (service) used by the client on behalf of the client.

In the above described conventional methods of advertising for a VOD streaming service, the client watches the advertisements prior to receiving the selected VOD contents. Further, the client cannot select the advertisements but passively receives and watches whatever advertisements are provided by an Internet contents service provider and then receives the selected VOD contents. Thus, a novel VOD streaming service system and business model based thereon which provides a new billing model for the contents of the VOD streaming service, and provides, for example, attracting advertisements that promote the client's interests, is needed.

SUMMARY OF THE INVENTION

The present invention provides a video on demand (VOD) streaming service according to client controlled advertisements (advertising) or in response to providing client/user-favored advertisements, and a method of performing the same.

The present invention also provides a client terminal receiving a VOD service, which enables a client/user to watch client/user preferred advertisements, and a method of performing the same.

Additional aspects and advantages of the invention will be set forth in part in the description which follows and, in part, will be obvious from the description, or may be learned by practice of the invention.

The present invention can be achieved by a VOD server providing a VOD streaming service, comprising a service controller providing clients multimedia contents according to client controlled advertising or in response to providing the clients specific advertisement contents selected and requested by the clients, and a data storage storing the multimedia contents, the advertisement contents, and the client data.

According to an aspect of the present invention, the service controller comprises a web service engine managing client access specifics, a search engine searching for the multimedia contents and the advertisement contents selected by the clients and retrieving the selected contents through the web service engine, a media streaming engine transferring the contents retrieved by the search engine to the client terminals, and a session management engine managing sessions during which the clients receive access to the VOD server according to client-forwarded/provided/driven advertisement selection interaction (i.e., according to client advertisement selection interaction) and/or client advertisement actions/interactions with the client selected advertisements.

According to an aspect of the present invention, the data storage comprises a client profile database storing the client data, an advertisement contents database storing the advertisement contents, and a multimedia contents database storing the multimedia contents, such as movies or music, to be provided to the clients.

The present invention can also be achieved by a client terminal, which receives multimedia contents and advertisement contents from a VOD server, comprising a web browser accessing the VOD server and selecting and requesting receipt of desired multimedia contents and advertisement contents, a session manager managing the sessions of the multimedia contents according to client advertisement contents selection interaction, and a reproducer reproducing the multimedia contents and the advertisement contents received from the VOD server according to the session management of the session manager.

The present invention can also be achieved by a method of providing a VOD streaming service which provides client-favored advertisement contents by using a VOD server enabling an advertisement selection interaction, comprising receiving a request for specific multimedia contents from a client and providing the requested multimedia contents to the client, checking the time or amount of the multimedia contents provided to stop the provision of the multimedia contents to the client when the time or the amount exceeds a predetermined value, providing advertisement contents which are requested by the client, receiving an advertisement contents stop request from the client and restarting transfer of the multimedia contents requested by the client.

The present invention can also be achieved by a method of receiving a VOD streaming service in a client terminal, comprising allowing a client to select multimedia contents, such as specific movies or music, and requesting a VOD server for the selected multimedia contents, reproducing the specific multimedia contents provided from the VOD server, requesting the VOD server for receipt of specific advertisement contents after a predetermined amount of time or receipt of multimedia content and reproducing the advertisement contents, and restarting receiving and reproducing the multimedia contents from the VOD server when an advertisement contents stop request is received from the client.

According to an aspect of the present invention, the requesting of the advertisement contents further comprises providing an advertisement selection image through the client terminal to allow the client to select and request receipt of the advertisement contents (i.e., to control advertising to the client).

According to an aspect of the present invention, the advertisement contents stop command can be selected after a predetermined amount of time from the start of reproduction of the advertisement contents.

BRIEF DESCRIPTION OF THE DRAWINGS

The above and/or other aspects and advantages of the present invention will become more apparent by describing in detail embodiments thereof with reference to the attached drawings in which.

DETAILED DESCRIPTION OF THE PREFERRED EMBODIMENTS

Figure 1:
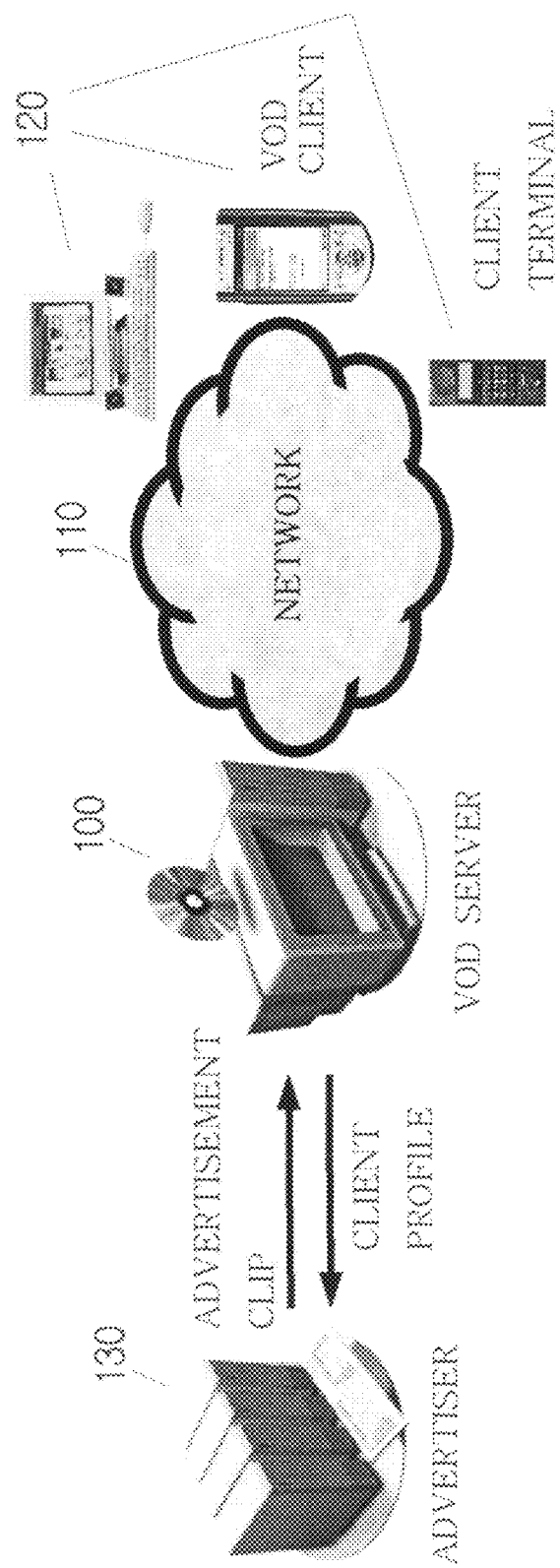
FIG. 1 is a system diagram of a conventional video on demand (VOD) streaming service system.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
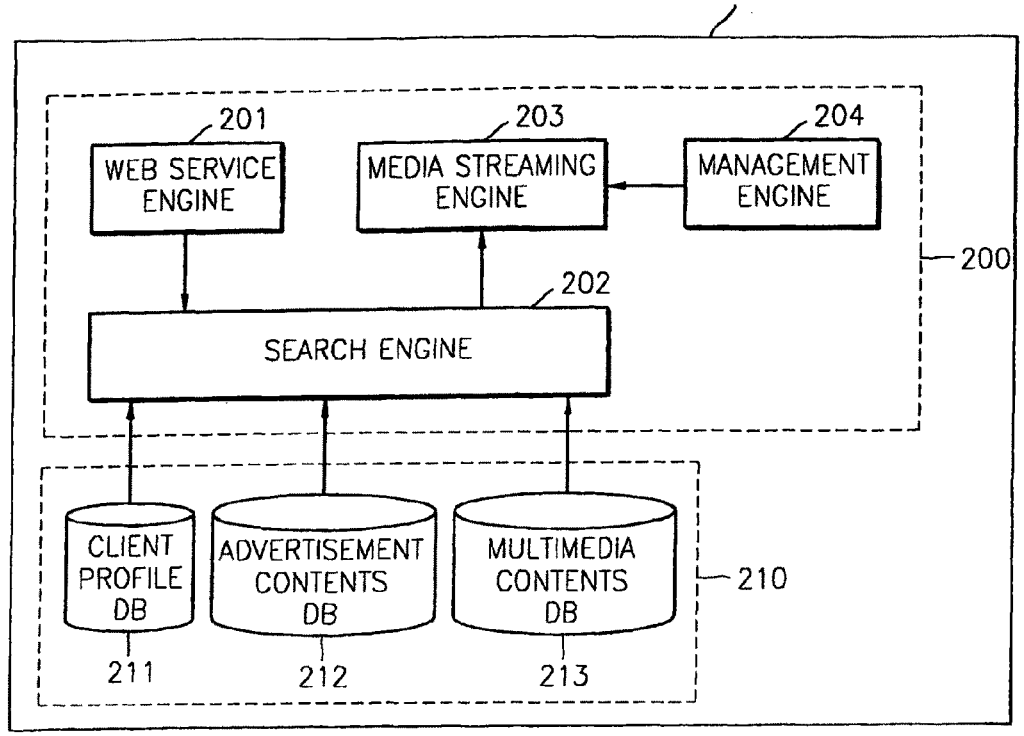
FIG. 2 is a functional block diagram of a VOD streaming server driven by client advertisement selection interaction during a VOD streaming service of the VOD streaming server, according to an embodiment of the present invention.

FIG. 2 is a functional block diagram of a VOD streaming server 190 driven/controlled by a client (e.g., a user, computing device, etc.) advertisement selection interaction during a VOD streaming service from the VOD streaming server 190, according to an embodiment of the present invention. The VOD streaming server 190 comprises a service controller 200 and a data storage 210. The service controller 200 provides multimedia contents requested by the client and advertisement contents provided by an advertiser. According to the invention, the client may directly select/request (i.e., control) the advertisement contents to receive in exchange for a VOD service, thereby providing a client-forwarded/provided/driven advertising and VOD service (i.e., client controlled advertising and VOD service). In particular, in the present invention, a client receives advertisement contents based upon client input. The service controller 200 comprises a web service engine 201, a search engine 202, a media streaming engine 203, and a session management engine 204. Here, the web service engine 201 manages client access specifics. The search engine 202 searches for and fetches the multimedia contents or the advertisement contents requested by the client through the web service engine 201. The media streaming engine 203 transfers the contents retrieved by the search engine 202. The session management engine 204 manages sessions of the client that accesses the VOD server 190.

The data storage 201 comprises a client profile database 211, an advertisement contents database 212, and a multimedia contents database 213. The client profile database 211 stores client data, which is used by the VOD server 190 to identify which client (device) has transmitted something to the VOD server 190 and to which client the VOD server 190 needs to respond. Further, typically, the client data comprises client profile information, such as client advertisement receipt history (client advertisement control history or client advertisement selection interaction history), client multimedia content selection history, client advertisement profile, etc. Typically, the advertisement contents database 212 stores the advertisement contents provided from the advertiser to the VOD server 190. The multimedia contents database 213 stores substantial data, such as movies and music, to be provided to the client, for example, as a VOD service in response to and/or in exchange for client advertisement selection interaction (client controlled advertisements). Accordingly, a VOD service can be controlled with client advertisement selection interaction during the VOD service.

Figure 3:
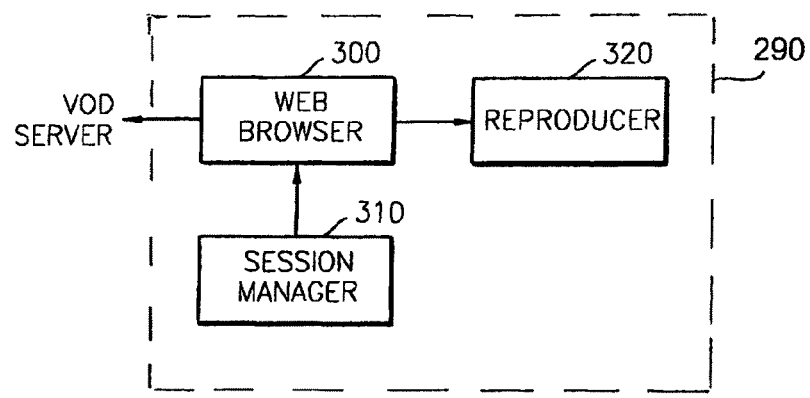
FIG. 3 is a functional block diagram of a VOD client terminal allowing client advertisement selection interaction to drive/control a VOD streaming service during the VOD streaming service, according to an embodiment of the present invention.

FIG. 3 is a functional block diagram of a VOD client terminal 290 allowing client advertisement selection interaction to drive/control a VOD streaming service during the VOD streaming service, according to an embodiment of the present invention. The VOD client terminal 290 comprises a web browser 300 accessing the VOD server 190, a session manager 310 managing the advertisement and multimedia contents sessions provided from the VOD server 190, and a reproducer 320 receiving the advertisement and multimedia contents from the VOD server 190 and reproducing the received contents.

The client may access the VOD server 190 through the web browser 300 of the VOD client terminal 290 and receive favored multimedia contents. In addition, the client may select favored advertisement categories from the categorized advertisement contents. The VOD server 190 receives data of the selected advertisement categories and transfers the advertisement contents corresponding to the selected advertisement categories to the VOD client terminal 290. Alternatively, the VOD server 190 may provide information on advertisement contents, which can be provided to the VOD client terminal 290, so that the web browser 300 of the VOD client terminal 290 can select a favored advertisement from the information. Thereafter, the VOD server 190 transfers the corresponding selected favored advertisement contents to the VOD client terminal 290.

The session manager 310 of the VOD client terminal 290 manages sessions of multimedia contents according to client advertisement selection interaction. For example, when the reproducer 320 reproduces requested multimedia contents, the session manager 310 checks time or amount of multimedia contents reproduced. If the time or the amount of multimedia contents reproduced exceeds a predetermined value, the reproducer 320 stops reproduction of the multimedia contents and the web browser 300 provides an advertisement contents selection function to the client, so that the client can select an advertisement to receive, for example, from an advertisement category list and/or from an advertisement list (i.e., controlled advertisement receipt). When the VOD server 190 provides the selected advertisement contents to the VOD client terminal 290, the reproducer 320 reproduces the selected advertisement contents. Typically, the session manager 310 checks whether a predetermined reproducing time for the received advertisement contents has passed and allows the client to select an advertisement contents stop command, if the predetermined time has passed. When the client selects the advertisement contents stop command, the VOD client terminal 290 recommences receipt of the multimedia contents from the VOD server 190 and reproduces the multimedia contents through the reproducer 320.

Figure 4:
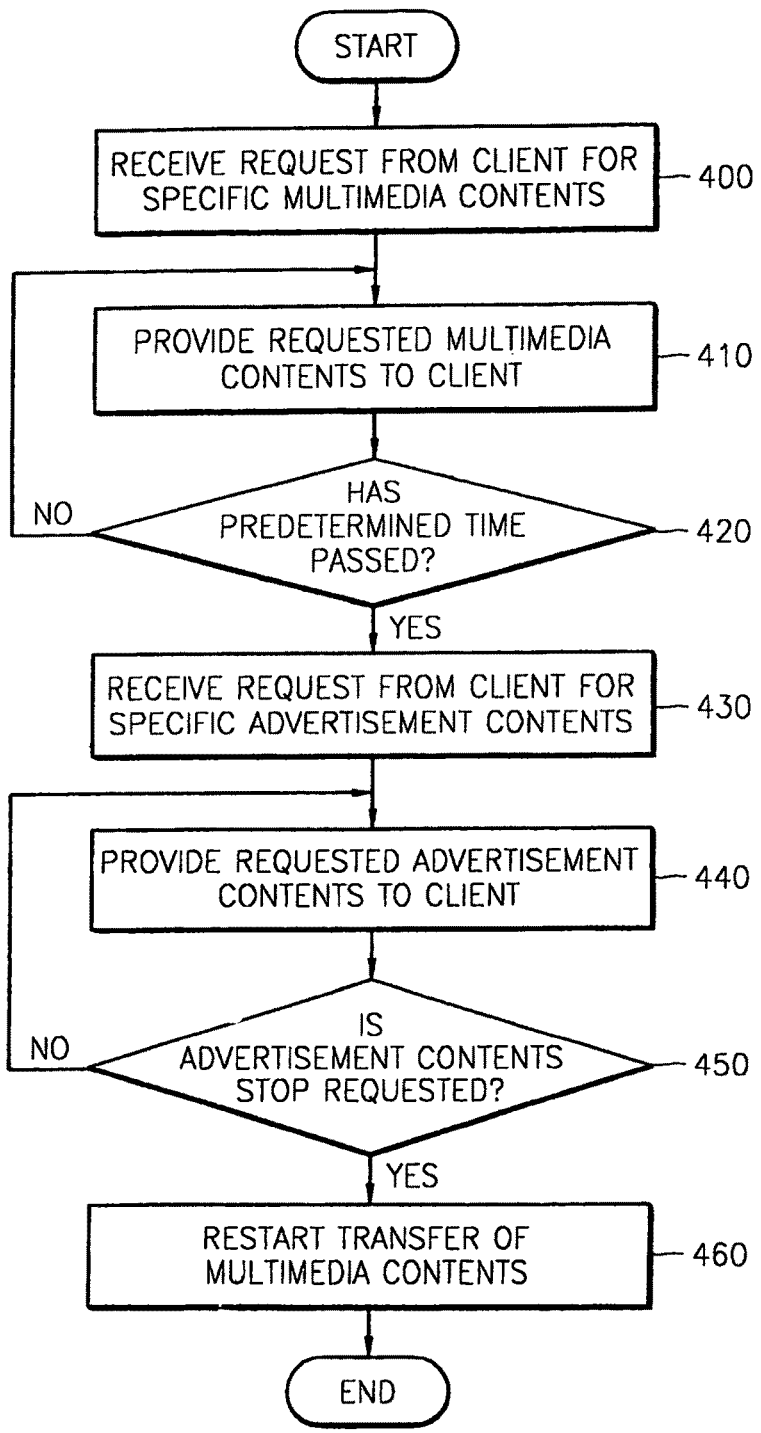
FIG. 4 is a flowchart of operations in a VOD server driven/controlled by a client advertisement selection interaction, according to an embodiment of the present invention.

FIG. 4 is a flowchart of operations in a VOD server driven/controlled by a client advertisement selection interaction, according to an embodiment of the present invention. Using the VOD server 190 shown in FIG. 2 as an example, initially, at operation 400, a client (e.g., a user, a computing device, etc.) requests the VOD server 190 for specific multimedia contents, such as movies or music. At operation 410, the VOD server 190 provides the multimedia contents requested by the client through the network. At operation 420, the VOD server 190 checks the time or amount of multimedia contents provided to the client to temporarily stop the provision of the multimedia contents when the time or amount exceeds a predetermined value.

If determined at operation 420 that the multimedia content reproduction time or amount has reached and/or exceeded the predetermined time or amount, the VOD server 190 stops the multimedia contents reproduction. At this time, recommencement of the multimedia contents reproduction requires client advertisement selection interaction or client controlled advertising, such as requesting receipt of advertisements and interacting with, viewing, etc., the client controlled advertisements. For example, the client selects one category from several advertisement categories and/or detailed advertisement profile data and requests the VOD server 190 for the corresponding advertisement contents in the client-selected category and/or according to the client-selected advertisement profile data. At operation 430, the VOD server 190 receives the advertisement request from the client, and, at operation 440, the VOD server provides the corresponding advertisement contents requested to the client. At operation 450, the VOD server 190 checks whether the client sends an advertisement contents stop command. In particular, typically, a client terminal, such as the client terminal 290, manages a client controlled advertising session and allows the client to send the advertisement stop command to the VOD server 190, after the client receives the client requested advertisement contents for a certain time, amount and/or performs an action, etc., with the client requested advertisement. Alternatively, the VOD server 190 can similarly manage the advertising session. When, at operation 450, the VOD server 190 receives the advertisement contents stop command from the client, at operation 460, the VOD server 190 recommences transfer of the temporarily stopped multimedia contents to the client.

The operation of transferring advertisement contents selected by the client is repeated when the predetermined multimedia reproduction time is again passed or the predetermined multimedia amount is again transferred to the client, after the restart of the transfer of the multimedia contents (i.e., after operation 460). Accordingly, the present invention provides a business model of providing/billing for network contents in response to and/or in exchange for client advertisement selection interaction (i.e., client controlled advertisements). In particular, for example, multimedia content streaming service can be controlled according to client-forwarded/provided/driven advertising and/or client advertisement selection interaction, such as client-selected (controlled) advertisement viewing, processing, etc, during the multimedia content streaming.

Figure 5:
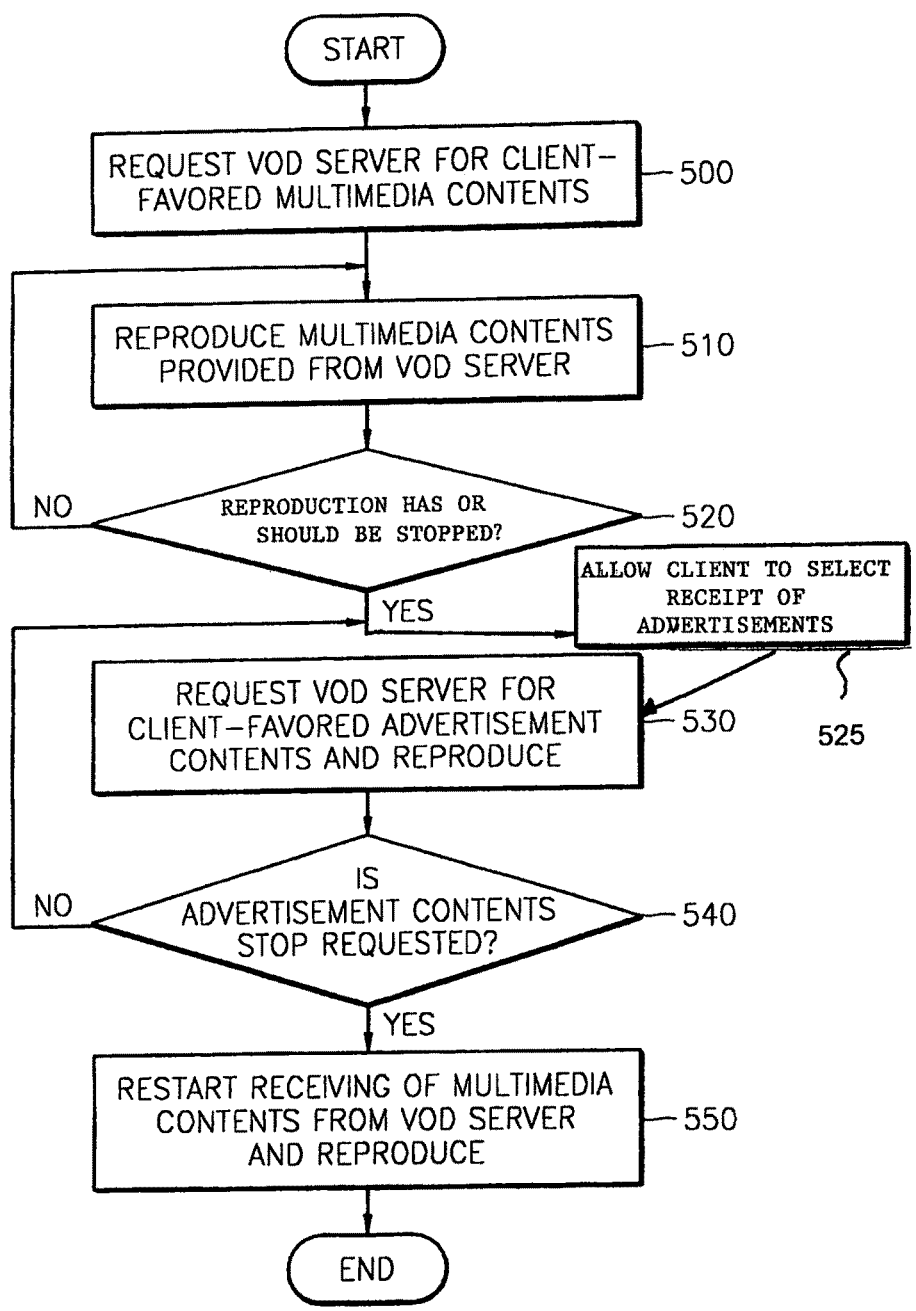
FIG. 5 is a flowchart of a VOD streaming service in a client terminal allowing client advertisement selection interaction to drive/control a VOD server during the VOD streaming service, according to an embodiment of the present invention.

FIG. 5 is a flowchart of a VOD streaming service in a client terminal allowing client advertisement selection interaction to drive/control a VOD server during the VOD streaming service, according to an embodiment of the present invention. Using the client terminal 290 and the VOD server 190 shown in FIGS. 3 and 2, respectively, as examples, initially, at operation 500, a client selects favored multimedia contents, such as a specific movie or music, using the client terminal 290. Further, at operation 500, the client terminal 290 requests the VOD server 190 for the selected multimedia contents. At operation 510, the client terminal 290 reproduces the selected multimedia contents provided from the VOD server 190.

At operation 520, the client terminal 290 determines if reproduction of the selected multimedia content has or should be stopped in response to, for example, a stop signal. Typically, the VOD server 190 generates a stop signal for the client terminal 290 or ceases providing the client-favored multimedia contents, when the VOD server 190 determines a time or an amount of the favored multimedia contents reproduced has exceeded a predetermined value. Alternatively, the client terminal 290 can determine when reproduction of the client-favored multimedia contents has or should be stopped. In particular, when the time or the multimedia contents reproduction amount exceeds the predetermined value, the client terminal 290 is informed of the end of the multimedia contents reproduction. At operation, 525, the client terminal 290 provides an advertisement selection image to allow the client to select and request receipt of advertisement contents. At operation 530, the client terminal 290 requests the VOD server 190 for the selected advertisement as client-favored (client controlled) advertisement contents, and receives the selected client-favored advertisement contents from the VOD server 190 and reproduces the received client selected advertisement contents.

After the advertisement contents are reproduced by the client terminal 290 for a predetermined amount or time, at operation 540, the client terminal 290 allows client input of an advertisement contents stop command and checks whether the client sends/inputs the advertisement contents stop command. In response to the advertisement contents stop command, at operation 550, the client terminal 290 stops the reproduction of the advertisement contents, and restarts receiving the temporarily stopped client-favored multimedia contents from the VOD server 19Q (e.g., sending another request for the client-favored multimedia contents to the VOD server 190, continuing reproduction from previously received client-favored multimedia content, etc.) and reproduces the client-favored multimedia contents.

The operation of allowing the client to select and request receipt of advertisement contents and transferring the selected advertisement contents, is repeated when a predetermined time has again passed or a predetermined client-favored multimedia content amount is reproduced after the restart of the reproduction of the client-favored multimedia contents (i.e., after operation 550).

Figure 6:
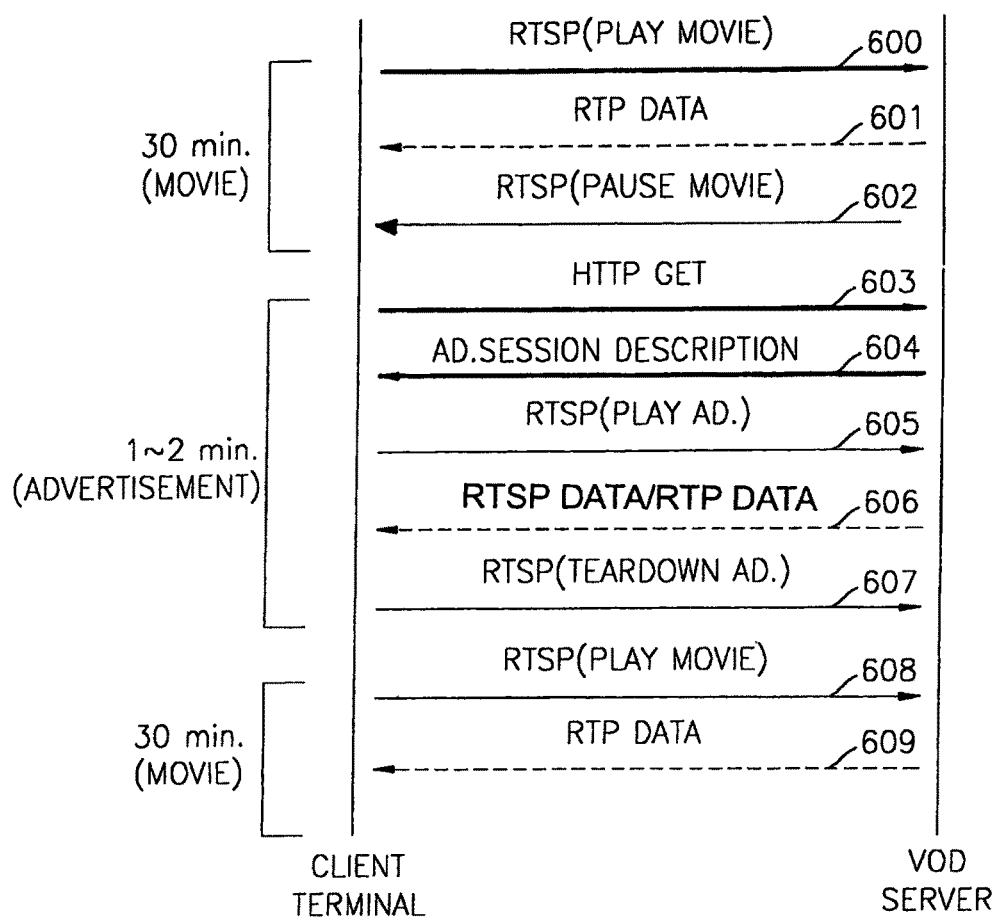
FIG. 6 is a flow diagram of a VOD streaming service with client-forwarded/provided/driven advertising between a VOD server and a client terminal, according to an embodiment of the present invention.

FIG. 6 is a flow diagram of a VOD streaming service with client-forwarded/provided/driven advertising between the VOD server 190 and the client terminal 290, according to an embodiment of the present invention. Hereafter, the client terminal 290 will be referred to as a terminal, and as Internet protocol examples, the real-time transport protocol (RTP) and the real-time transport streaming protocol (RTSP) is used for communicating real-time data and streaming control data and the Hyper Text Transfer Protocol (HTTP) is used for communicating messages between the VOD server 190 and the terminal 290.

At operation 600, the terminal requests the VOD server 190 for specific multimedia contents. At operation 601, the VOD server 190 provides the requested multimedia contents (RTP data) to the terminal 290. When a predetermined time, for example, thirty minutes, has passed from the start of the provision of the multimedia contents, or a predetermined amount of multimedia contents is provided, at operation 602, the VOD server 190 transfers a multimedia contents stop signal (RTSP) to the terminal.

At operation 603, a client interactive (client controlled) advertisement session begins, in which the terminal 290 requests (HTTP Get) the VOD server 190 for advertisement contents. At operation 604, the VOD server 190 provides the advertisement contents to the terminal 290, and the client selects receipt of one of the provided and displayed advertisement contents by using a predetermined output unit of the terminal 290, for example, a screen of the web browser. At operation 605, the terminal 290 requests (RTSP) the VOD server 190 for the corresponding advertisement contents selected to be received by the client.

At operation 606, the VOD server 190 transfers (RTSP data, or RTP data in case of streaming advertisements) the advertisement contents requested by the client to the terminal 290, and the terminal 290 reproduces the provided advertisements until the client is permitted to stop the advertisement reproduction to resume reproduction of the multimedia contents. If the client inputs an advertisement reproduction stop command/signal, at operation 607, the terminal 290 sends an advertisement contents stop request (RTSP) to the VOD server 190.

At operation 608, the terminal 290 again requests the VOD server 190 for the multimedia contents. At operation 608, the VOD server 190 continues (resumes) providing the multimedia contents requested by the terminal 290.

The above operations can be repeated until the provision of the selected multimedia contents from the VOD server to the terminal is completed according to client-advertisement selection interaction.

As described above, the clients can receive advertisement contents selectively during the VOD streaming service to pay for the VOD services, thereby providing a new VOD billing business model. The client can control advertising (advertisement receipt), allowing direct client controlled interactive advertising as opposed to the conventional passive (captive) advertising. Advantageously, the client may select receipt of preferred advertisement contents. In this way, it is easier to attract both the client's and the advertiser's interests. The predetermined reproduction times and amounts can be tied to predetermined advertising values, thereby providing an underlying business model of paying for a VOD service according to client-forwarded/provided/driven (client controlled) advertising. Although, the example embodiments describe tying client controlled advertisement receipt to a time and/or advertisement reproduction time, the present invention is not limited to such a configuration and other client advertisement receipt measures can be implemented according to business needs/applications, such as amount and/or type of client interaction/input with/for an advertisement. In particular, the present invention provides an apparatus and a method of sending/receiving video on demand (VOD) streaming service in response to and/or in exchange for client-favored (controlled) advertisements, providing an underlying business model of client controlled advertising and VOD service. A VOD server and a VOD client terminal tie the VOD streaming service to client advertisement selection interactions, such as advertisement receipt selections and/or attributes (e.g., type, mode, etc.) of the received advertisements. The client session management regarding the client-favored multimedia contents and the client controlled advertisement contents can be performed on the VOD server and/or on the client VOD client terminal.

Further, the present invention provides a system and method of providing on demand contents via a network according to client controlled advertising to the client, wherein the client controls the advertising, for example, by selecting advertisement receipt according to categories and/or selecting advertising attributes. In particular, the present invention provides a content on demand network system allowing client controlled advertisements to drive/control a content streaming service prior to commencement of and/or during the content streaming service. The processes of the present invention providing/billing on demand electronic contents according to client controlled advertising to the client are implemented in software and/or hardware.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A client terminal, including at least one processing device, to receive multimedia contents and advertisement contents from a multimedia server, the client terminal comprising:

a web browsing unit, using the at least one processing device, to access the multimedia server and to request desired multimedia contents and advertisement contents; and a session manager to manage a multimedia contents reproduction session reproducing the multimedia contents according to client initiated receipt of the advertisement contents via the web browsing unit after an automated cessation of a sequentially previous provision of the multimedia contents to the client and before a user requested resuming of the provision of the multimedia contents to the client, wherein the user requested resuming resumes the provision of the multimedia contents before completion of a provision of the advertisement contents and after a predetermined period of time having expired or predetermined amount of the advertisement contents having been provided during the provision of the advertisement contents, wherein the session manager controls the user requested resuming through a transmission of an advertisement contents stop request to the multimedia server to control a stoppage of the transmission of the advertisement contents and a subsequent transmission of a multimedia request command to the multimedia server during the provision of the advertisement contents, based on the advertisement contents stop request, to initiate an immediate resumption of the provision of the multimedia contents to the client.

2. A method of receiving streaming service in a client terminal, the method comprising:

providing a client information of available multimedia contents from a multimedia server and transmitting indication of a corresponding client selected multimedia contents to the multimedia server;

receiving and reproducing the selected multimedia contents provided from the multimedia server;

providing, after an automated suspension of the reproduction of the selected multimedia contents by the multimedia server based on an expiration of a predetermined amount of time and/or reproduction extent of the selected multimedia contents, the client information of a plurality of advertisement contents available through the multimedia server and transmitting an indication of a corresponding client-selected advertisement contents to the multimedia server before receipt of the client-selected advertisement contents;

receiving the client-selected advertisement contents and reproducing the client-selected advertisement contents based upon predetermined conditions; and receiving an advertisement contents stop request from the client and transmitting the advertisement contents stop request to the multimedia server, and transmitting a subsequent multimedia request command, based on the advertisement contents stop request, to initiate an immediate resuming of the receiving and reproducing of the selected multimedia contents from the multimedia server, with the multimedia server immediately resuming provision of the selected multimedia contents upon receipt of the multimedia request command during provision of the client-selected advertisement contents from the client terminal after the advertisement contents stop request and before completion of a transmission of the client-selected advertisement contents to the client terminal when a predetermined period of time has expired or predetermined amount of the client-selected advertisement contents has been received during the receiving of the client-selected advertisement contents.

3. The method of claim 2, wherein the providing the client the information of the plurality of advertisement contents available from the multimedia server further comprises providing the client an advertisement selection image through the client terminal to enable the client to select receipt of the client-selected advertisement contents available through the multimedia server.

4. A method of receiving streaming service in a client terminal, the method comprising:

providing a client information of available multimedia contents from a multimedia server and transmitting indication of a corresponding client selected multimedia contents to the multimedia server;

receiving and reproducing the client selected multimedia contents provided from the multimedia server;

providing, after an automated suspension of the reproduction of the selected multimedia contents by the multimedia server based on an expiration of a predetermined amount of time and/or reproduction extent of the selected multimedia contents, the client information of a plurality of advertisement contents available through the multimedia server and transmitting an indication of a corresponding client-selected advertisement contents to the multimedia server;

receiving the client-selected advertisement contents and reproducing the client-selected advertisement contents based upon predetermined conditions; and receiving an advertisement contents stop request from the client and transmitting the advertisement contents stop request to the multimedia server, and transmitting a subsequent multimedia request command, based on the advertisement contents stop request to initiate an immediate resuming of the receiving and reproducing of the selected multimedia contents from the multimedia server, with the multimedia server immediately resuming provision of the selected multimedia contents upon receipt of the multimedia request command during provision of the client-selected advertisement contents from the client terminal after the advertisement contents stop request and before completion of a transmission of the client-selected advertisement contents to the client terminal, wherein the advertisement contents stop request is selectable by the client only after a predetermined amount of time from a start of the reproducing of the client-selected advertisement contents and before completion of reproduction of the client-selected advertisement contents.

5. A method of providing a streaming service from a multimedia server to a client terminal according to user-favored advertisement contents, comprising:

receiving by the multimedia server a real-time transport streaming protocol (RTSP) play video command from a client terminal;

transmitting a corresponding video to the client terminal as real-time transport protocol (RTP) data;

determining a time expired or amount of the video transmitted to the client terminal to suspend the transmitting of the video to the client terminal when the time expired or the amount of the video transmitted exceeds a respective predetermined value;

automatically providing an RTSP pause video command from the multimedia server to the client terminal to indicate a pausing of the video transmission based upon the time expired or the amount of the video transmitted exceeding the respective predetermined value;

establishing a hyper text transfer protocol (HTTP) user controlled advertisement session upon the suspension of the transmitting of the video to the client terminal;

receiving an RTSP play advertisement request from the client terminal;

transmitting to the client terminal user requested advertisement, selected based upon a received user selection of particular advertisement categories and/or advertisements that have particular advertisement attributes, before the transmitting of the user requested advertisements, as RTP data and/or RTSP data upon receipt of the RTSP play advertisement request;

determining, before expiration of a full transmission of the user requested advertisements, whether a time expired or amount of the transmitted user requested advertisements transmitted to the client terminal exceeds a respective predetermined value to determine whether to act on a client terminal request to stop the transmitting of the user requested advertisement;

receiving an RTSP stop advertisement command from the client terminal to tear down the HTTP session and stop the transmission of the user requested advertisement if the time expired or the amount of the transmitted user requested advertisement transmitted to the client terminal exceeds the respective predetermined value;

receiving another RTSP play video message immediately subsequent to the receiving of the RTSP stop command; and resuming the transmitting of the video as the RTP data upon receipt of the other RTSO play video message.

6. A multimedia server, which provides a streaming service, the multimedia server comprising:

a service controller to provide multimedia contents to a client terminal in accordance with client controlled receipt of advertisement contents, which the client terminal is obligated to receive at least a portion of, by automatically suspending transmission of the advertisement contents transmitted to the client terminal, with the transmission of the advertisement contents occurring between an automatically interrupting of a sequentially previous provision of the multimedia contents to the client terminal and immediately before a resuming of the provision of the multimedia contents to the client terminal after receipt, when a predetermined period of time has expired or predetermined amount of the advertisement contents has been transmitted during the transmission of the advertisement contents, of an advertisement stop command from the client terminal to control a stoppage of the transmission of the advertisement contents to the client terminal and upon receipt of a subsequent multimedia request command during provision of the advertisement contents from the client terminal, based on the advertisement stop command, initiating an immediate resuming of the transmission of the multimedia contents to the client terminal, and with the immediate resuming of the provision of the multimedia contents to the client terminal being performed regardless of completion of the transmission of the advertisement contents to the client terminal; and a data storage to store the multimedia contents, the advertisement contents, and client data, wherein, when the advertisement stop command is not received from the client terminal during the transmission of the advertisement contents, the immediate resuming of the provision of the multimedia contents to the client terminal is performed upon completion of reproduction of the advertisement contents, wherein the service controller comprises:

a web service engine managing client access specifics;

a search engine retrieving multimedia contents and advertisement contents requested by the client terminal from the data storage through the web service engine;

a media streaming engine transferring requested media contents retrieved by the search engine to the client terminal; and a session management engine managing sessions during which the client terminal accesses the multimedia server according to the client controlled receipt of the advertisement contents.

7. A client terminal, including at least one processing device, to receive multimedia contents and advertisement contents, the client terminal comprising:

a web browsing unit, using the at least one processing device, to access a multimedia server and to request desired multimedia contents and advertisement contents; and a session manager to manage a multimedia contents reproduction session, to control receipt and reproduction of the multimedia contents, according to client initiated receipt of the advertisement contents, which the client terminal is obligated to receive at least a portion of, via the web browsing unit during an automated intermission of the multimedia contents reproduction session, with a client of the client terminal being provided with an option to request a stopping of receipt of the advertisement contents through transmission of an advertisement stop command to the multimedia server when a predetermined period of time has expired or predetermined amount of the advertisement contents has been received during the receiving of the advertisement contents, reproduction of the advertisement contents including automatically interrupting the multimedia contents reproduction session from the multimedia server, and including immediately resuming of the multimedia contents reproduction session from the multimedia server based upon transmission by the client terminal of a multimedia request command to the multimedia server during the receipt and reproduction of the advertisement contents to initiate the immediate resuming of the receipt of the multimedia contents, wherein the multimedia request command is transmitted during provision of the advertisement contents to the multimedia server immediately after a transmission of the advertisement stop command to control a stoppage of a transmission of the advertisement contents to the client terminal, and the immediate resuming of the multimedia contents reproduction session being performed regardless of completion of the receipt and reproduction of the advertisement contents from the multimedia server, wherein, when the advertisement stop command is not transmitted to the multimedia server during the receipt and reproduction of the advertisement contents, the resuming of the multimedia contents reproduction session is performed after completion of the receipt and reproduction of the advertisement contents.

8. The client terminal of claim 7, wherein the immediate resuming of the multimedia contents reproduction session is performed only after the transmission of the advertisement stop command and upon passage of a predetermined minimum period of time before completion of transmission of the advertisement contents to the client terminal.

9. A multimedia server, including at least one processing device, to provide a streaming service, the server comprising:

a service controller, of the multimedia server providing the streaming service, using the at least one processing device to transmit multimedia contents to a client, to suspend transmission of the multimedia contents to the client to provide the client information of a plurality of available advertisement contents, to receive from the client a request for client- selected advertisement contents and provide the client-selected advertisements contents among the plurality of available advertisements contents to the client, and to resume provision of the multimedia contents, beginning at a point corresponding to the suspension of the transmission of the multimedia contents, to the client after receipt of a transmitted advertisement contents stop request from the client, before completion of the provision of the client-selected advertisement contents, to stop the provision of the client-selected advertisement contents and upon receipt of a subsequently transmitted multimedia request command during provision of the client-selected advertisement contents to initiate the resuming of the provision of the multimedia contents when a predetermined period of time has expired or predetermined amount of the client-selected advertisement contents has been provided during the provision of the client-selected advertisement contents.

10. The multimedia server of claim 9, further comprising:
a data storage storing the multimedia contents, the plurality of available advertisement contents, and client data, and wherein the service controller comprises:
a web service engine managing client access specifics;
a search engine retrieving multimedia contents and advertisement contents requested by the client from the data storage through the web service engine;
a media streaming engine transferring the requested contents retrieved by the search engine to the client; and
a session management engine managing sessions during which the client accesses the multimedia server according to client controlled receipt of the retrieved advertisements.

11. The multimedia server of claim 9, further comprising:
a data storage storing a client profile database;
an advertisement contents database storing the plurality of available advertisement contents; and
a multimedia contents database storing the multimedia contents.

12. A method of providing a streaming service which provides client-favored advertisement contents by using a multimedia server enabling a client advertisement selection interaction, the method comprising:
receiving, using at least one processing device, a request for specific multimedia contents from the client and providing the requested multimedia contents to the client;
checking a time or amount of the multimedia contents provided to stop the provision of the multimedia contents to the client when the time or the amount exceeds a respective predetermined value;
requesting, before provision of advertisement contents and after the stopping of the provision of the multimedia contents, the client choose advertisement contents, from a plurality of offered advertisement contents offered by the server, and subsequently automatically providing the chosen advertisement contents to the client as the client-favored advertisement contents when the provision of the multimedia contents to the client is stopped based upon the checked time or amount and before an immediately subsequent restarting of the multimedia contents; and
the immediately restarting of the providing of the multimedia contents is performed upon receipt of a multimedia request command during the provision of the advertisement contents to initiate the immediate restarting of the providing of the multimedia contents and after a previous receipt of an advertisement contents stop request from the client before completion of the providing of the advertisement contents to the client when a predetermined period of time has expired or predetermined amount of the advertisement contents has been provided during the provision of the advertisement contents.

13. A method, comprising:
providing contents to a client via a network in exchange for providing client controlled advertisements to the client, which the client is obligated to receive at least a portion of;
requesting an advertisement selection by the client requesting advertisements within particular categories and/or advertisements that have particular advertisement attributes, before provision of the client controlled advertisements to the client and after provision of at least a portion of the contents;
providing the client controlled advertisements to the client based upon the advertisement selection by the client requesting advertisements within the particular categories and/or advertisements that have the client chosen advertisement attributes after the requesting of the advertisement selection and before a restarting of the providing of the contents to the client; and
the restarting of the providing of the contents to the client being based upon an advertisement contents stop request transmitted by the client, prior to completion of the providing of the client controlled advertisements, to control a stoppage of the provision of the client controlled advertisements and a subsequent transmission of a multimedia request command during provision of the client controlled advertisements, based on the advertisement contents stop request, to initiate an immediate restart of the provision of the contents when a predetermined period of time has expired or predetermined amount of the client controlled advertisements has been provided during the provision of the client controlled advertisements.

14. The method of claim 13, wherein the contents is a movie and the client is provided the movie for receipt and/or viewing in exchange of the client receiving and/or viewing the client controlled advertisements.

15. A multimedia server, including at least one processing device, to provide a streaming service, the server comprising:
a service controller, using the at least one processing device, providing multimedia contents to a client according to client controlled receipt of advertisement contents by stopping provision of an advertisement, which the client is obligated to see a portion of, automatically having interrupted a sequentially previous provision of the multimedia contents to the client and immediately resuming of the provision of the multimedia contents to the client based upon receipt of an advertisement stop command from the client and receipt of a subsequent multimedia request command during the provision of the advertisement to initiate the immediate resuming of the provision of the multimedia contents, with the resumption of the provision of the multimedia contents being performed regardless of completion of the provision of the advertisement to the client and after a predetermined period of time of the provision of the advertisement having expired or predetermined amount of the advertisement having been provided, and wherein, when the advertisement stop command is not received from the client during the provision of the advertisement, the provision of the multimedia contents is resumed.

16. The server of claim 15, wherein the immediately resuming of the multimedia contents is performed, after the receipt of the advertisement stop command, upon passage of a predetermined minimum period of time before the completion of the provision of the advertisement to the client.

17. The server of claim 15, further comprising:
a data storage storing a client profile database;
an advertisement contents database storing the advertisement contents; and
a multimedia contents database storing the multimedia contents.

18. A multimedia server, including at least one processing device, to provide a streaming service, the server comprising:
a service controller, of the multimedia server providing the streaming service, using the at least one processing device to transmit multimedia contents to a client, to suspend transmission of the multimedia contents to the client to provide the client information of a plurality of available advertisement contents, to receive from the client a request for client-selected advertisement contents and providing the client-selected advertisements contents among the plurality of available advertisements contents to the client for at least a predetermined period of time or predetermined amount before permitting the client to stop receipt of the client-selected advertisements during reproduction of the client-selected advertisement before completion of the providing of the client-selected advertisement, and to resume provision of the multimedia contents, beginning at a point corresponding to the suspension of the transmission of the multimedia contents, to the client after receipt of a transmitted advertisement contents stop request to stop the provision of the client-selected advertisement contents from the client and upon receipt of a subsequently transmitted multimedia request command during the provision of the client-selected advertisement to initiate an immediate resumption of the provision of the multimedia contents.

19. A method of providing a streaming service which provides client-favored advertisement contents by using a multimedia server enabling a client advertisement selection interaction, the method comprising:
receiving, using at least one processing device, a request for multimedia contents from the client and providing the multimedia contents to the client;
checking a time or amount of the multimedia contents provided to stop the provision of the multimedia contents to the client when the time or the amount exceeds a respective predetermined value;
requesting the client choose advertisement contents, from a plurality of offered advertisements contents offered by the server, and automatically providing the chosen advertisement contents to the client as the client-favored advertisement contents when the provision of the multimedia contents to the client is stopped based upon the checked time or amount; and
restarting the providing of the multimedia contents is performed upon receipt of a multimedia request command during the provision of the chosen advertisement to initiate an immediate restarting of the providing of the multimedia contents and after a previous receipt of an advertisement contents stop request from the client to control a stoppage of the provision of the chosen advertisement contents, before completion of the providing of the chosen advertisement contents to the client and after a predetermined period of time of the provided chosen advertisement having been expired or predetermined amount of the chosen advertisement having been provided.

20. A client terminal, including at least one processing device, to receive multimedia contents and advertisement contents from a multimedia server, the client terminal comprising:
a web browsing unit, using the at least one processing device, to access the multimedia server and to request desired multimedia contents and advertisement contents; and
a session manager to manage a multimedia contents reproduction session reproducing the multimedia contents according to client initiated receipt of the advertisement contents, via the web browsing unit after an automated cessation of a sequentially previous provision of the multimedia contents to the client and before a user requested resuming of the providing of the multimedia contents to the client during provision of the advertisement contents,
wherein the client initiated receipt of the advertisement contents is based upon an advertisement selection, before the provision of advertisement contents and directly after the automated cessation of the sequentially previous provision of the multimedia contents, by the client requesting the receipt of the advertisements contents as being within particular categories and/or advertisements that have client chosen advertisement attributes, and
wherein the session manager controls the user requested resuming through a transmission of an advertisement contents stop request to the multimedia server to control a stoppage of the transmission of the advertisement contents before completion of the transmission of the advertisement contents and a subsequent transmission of a multimedia request command to the multimedia server during provision of the advertisement contents, based on the advertisement contents stop request, to initiate an immediate resumption of the providing of the multimedia contents when a predetermined period of time has expired or predetermined amount of the advertisement contents has been received.

* * * * *